(12) United States Patent
Leither

(10) Patent No.: US 9,695,864 B2
(45) Date of Patent: Jul. 4, 2017

(54) CABLE CONNECTOR

(71) Applicant: Ed Leither, Battle Creek, MI (US)

(72) Inventor: Ed Leither, Battle Creek, MI (US)

(73) Assignee: Hi-Lex America, Inc., Battle Creek, MI (US)

( * ) Notice: Subject to any disclaimer, the term of this patent is extended or adjusted under 35 U.S.C. 154(b) by 0 days.

(21) Appl. No.: 14/679,352

(22) Filed: Apr. 6, 2015

(65) Prior Publication Data

US 2016/0290386 A1    Oct. 6, 2016

(51) Int. Cl.
| | |
|---|---|
| *F16C 1/14* | (2006.01) |
| *F16C 1/10* | (2006.01) |
| *G05G 9/00* | (2006.01) |
| *F16C 11/04* | (2006.01) |

(52) U.S. Cl.
CPC .............. *F16C 1/14* (2013.01); *F16C 1/106* (2013.01); *G05G 9/00* (2013.01); *F16C 11/04* (2013.01)

(58) Field of Classification Search
CPC .. F16C 1/14; F16C 1/145; F16C 1/265; F16C 1/106; F16C 1/262; F16C 1/102; F16C 1/20; F16H 61/36; Y10T 74/20049; Y10T 74/2045

See application file for complete search history.

(56) References Cited

U.S. PATENT DOCUMENTS 4,625,826 A * 12/1986 Schmid ................. B62D 11/04
                                                180/315

FOREIGN PATENT DOCUMENTS

| DE | 19544837 A1 * | 6/1996 | ............. F16H 61/36 |
| FR | 2956707 A1 * | 8/2011 | ............. F16C 1/102 |
| FR | 2956886 A1 * | 9/2011 | ............. F16C 1/106 |

* cited by examiner

*Primary Examiner* — Thomas C Diaz
(74) *Attorney, Agent, or Firm* — Varnum, Riddering, Schmidt & Howlett LLP

(57) ABSTRACT

A control cable assembly includes a yoke having a body and a first and second end. The yoke includes a first hinge at its first end and a second hinge at its second end. The first and second hinges may each comprise a pair of eyelets. The first eyelet on each hinge may form a closed loop, and the second eyelet on each hinge may form a partially open loop, having a gap. A first control cable may be connected to the first hinge. A second control cable may be connected to the second hinge. The control cables may be configured to pivot with respect to the yoke.

10 Claims, 3 Drawing Sheets

CABLE CONNECTOR

FIELD OF INVENTION

The present invention generally relates to a control cable assembly and method for assembling the same.

BACKGROUND

Control cables are cable assemblies that are commonly used in various applications to transfer motion from a first point to a second point. The cables may be connected at a first end to a lever or movable device and at a second end to an actuator or second movable device. The cables may transfer the motion of the lever to the actuator to apply a desired force across a distance.

Control cables provide several advantages over alternative devices, such as connecting rods. Commonly, control cables are composed of flexible but durable materials, such as steel or metallic wire strands wound together. The cables may be flexible enough to bend around other components but strong enough to apply a push force and a pull force. The cable flexibility leads to reduced wear within the system. The control cables also provide lower noise transmission and reduced assembly costs.

In some applications, control cables may be used in tandem or in coupled pairs. One such application is in small motor vehicles, such as golf carts, four-wheelers, and other small off-road vehicles. Often, these types of vehicles have gear selections of only forward and reverse. In these types of applications a control cable may be used for transferring motion from the gear selection lever to the gear actuator.

Because the forward and reverse gears should not be simultaneously activated, the control cable coupling may be designed to move the first and second cables in opposite directions of each other. For example, the first and second control cables may be held by a coupling device. The coupling device may interconnect the first and second control cables and allow them to rotate with respect to the coupling device. The coupling device may further be rotatably connected to a base to allow reciprocating movement of the first and second cables with respect to one another.

Current designs for cable pairings suffer from several drawbacks and deficiencies. First the cables often wear and require maintenance or replacement. Current cable pairing designs, however, do not allow the cable to be disconnected or removed from the coupling device. Therefore, the entire assembly must often be replaced in order to service a single cable. Alternatively, the coupling device can be deformed in order to remove the cable from the pairing. However, this results in damage to the coupling device and increases the chance of future failure.

A second drawback is that current designs of cable pairings require difficult assembly. Specifically, because the coupling device is not configured to allow the first or second cable to be removable, the cables must be fully assembled in the coupling device. This slows down the assembly process, costing time and ultimately money.

Accordingly, an improved attachment for connecting the control cables and other vehicle accessories to a vehicle is needed in the art.

SUMMARY

A control cable assembly is generally provided. The control cable assembly includes a yoke having a body and a first and second end. The yoke includes a first hinge at its first end and a second hinge at its second end. The first and second hinges may each comprise a pair of eyelets. The first eyelet on each hinge may form a closed loop, and the second eyelet on each hinge may form a partially open loop, having a gap.

One or control cables may be connected to the yoke. A first control cable may be connected to the first hinge. A second control cable may be connected to the second hinge.

In an embodiment, the eyelets on each hinge may be approximately aligned. The eyelets may be positioned a distance apart from one another.

In an embodiment, the control cables may include a pin positioned along the cables. The pin may be held in place on a first side by a spring mechanism and may be held in place on a second side by an anchor. The spring mechanism may include a spring biased toward the pin.

The yoke may include a central bore. The yoke may be attached to a base by a bolt through the central bore, and may be pivotable with respect to the base.

In an embodiment, a method for assembling a control cable assembly may include providing a first cable comprising a wire, a pin positioned along the wire, and a spring mechanism positioned on a first side of said pin; providing a yoke comprising a body having a first end and a second end, a first hinge at a first end of the body including a first eyelet forming a completely closed loop and a second eyelet forming a partially open loop, and a second hinge at a second end of said body including a third eyelet forming a completely closed loop and a fourth eyelet forming a partially open loop; separating the spring mechanism from the anchor; placing the pin in the first hinge; and closing the space between spring mechanism and anchor.

BRIEF DESCRIPTION OF THE DRAWINGS

The operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A cable pairing 100 is generally presented. The cable pairing 100 is generally configured to integrate two or more cables and allow controlled movement of the cables with respect to one another.

Figure 1:
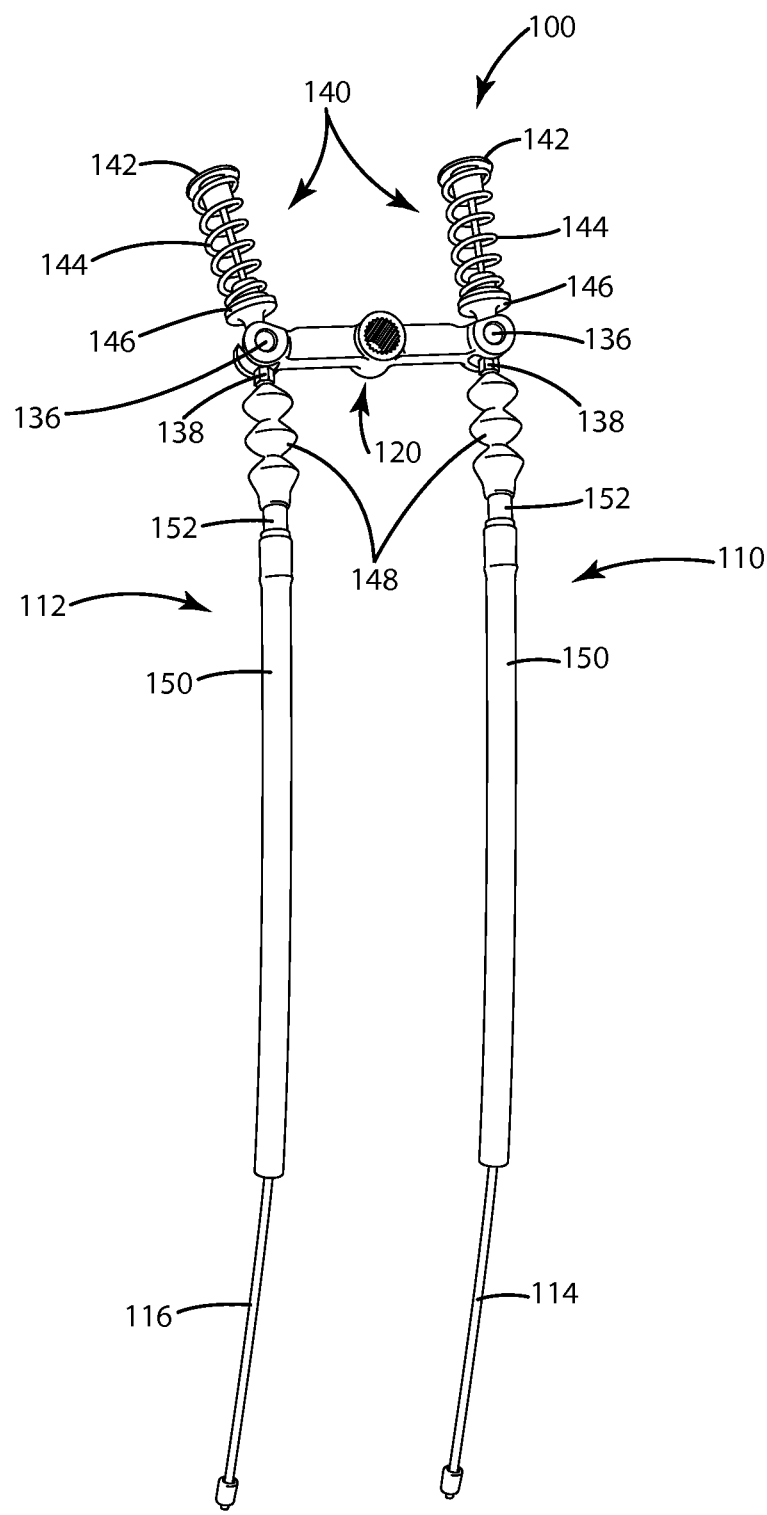
FIG. 1 illustrates a top view of cable paring having two cables and a connecting yoke.
Figure 2:
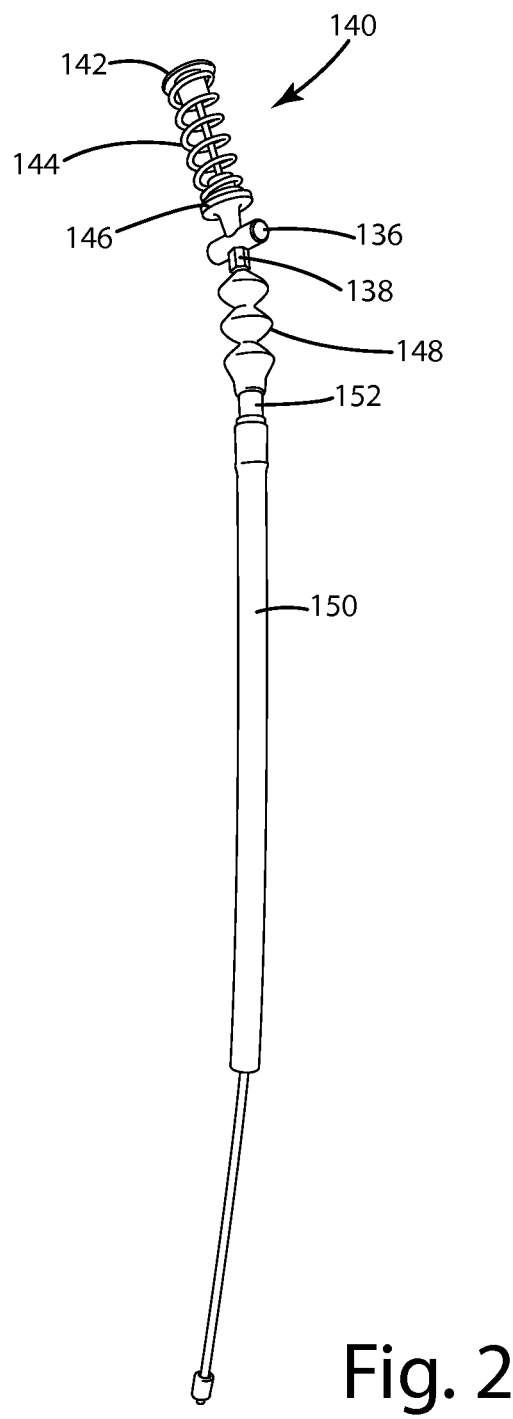
FIG. 2 illustrates an assembled cable.
Figure 3:
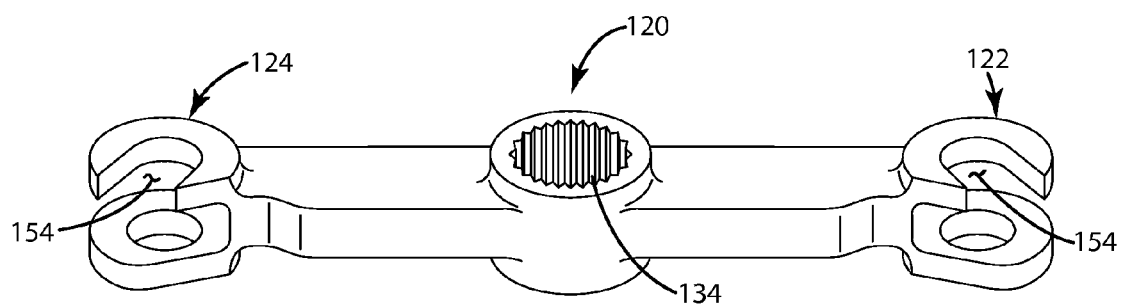
FIG. 3 illustrates a perspective view of a yoke.

As shown in FIG. 1, the cable pairing 100 may comprise two cables, including a first cable 110 and a second cable 112, connected together. The first and second cables 110, 112 may include first and second wires 114, 116. The wires 114, 116 may be formed of any appropriate material, such as steel windings, plastic or polymer, or any appropriate material. The cables 110, 112 may further include other insulation and connecting components, as described in further detail below.

The cables 110, 112 may be configured to actuate a device, such as a gearing. For example, the first wire 114 may be tied at a first end to a first actuator and the second wire 116 may be tied at a first end to a second actuator. The wires 114, 116 may each be tied at a second end to a gear selection device, such as a lever or the like. The actuators may be mutually exclusive. The cable pairing 100 may be configured such that movement of the first cable 110 in a first direction may facilitate movement of the second cable 112 in the opposite direction to prevent activating both actuators simultaneously.

The first and second cables 110, 112 may be tied together by a yoke 120. The yoke 120 may be composed of any appropriate materials, such as cast metal. The yoke 120 may comprise a generally linear body having openings therein, as described below.

The yoke 120 may be configured to interconnect the cables 110, 112 at either end of the body. The yoke 120 may include hinges 122, 124 at each end of the body. The hinges 122, 124 may each comprise a pair of eyelets formed in the body. The first pair of eyelets 126, 128 at a first end may be aligned with one another, and the second pair of eyelets 130, 132 at a second end may be aligned with one another. The eyelets 126, 128, 130, 132 may be generally circular. Each set of eyelets 126, 128, 130, 132 may be spaced apart to allow a cable to pass through. One or more of the eyelets 126, 128, 130, 132 may be modified to allow connection and disconnection of a cable to the yoke 120, as described in further detail below.

The yoke 120 may include a central bore 134. The central bore 134 may comprise an opening generally centrally positioned along the body. The central bore 134 may be generally positioned midway between the hinges 122, 124.

The cables 110, 112 may include various components to connect to the yoke 120 and facilitate assembly and disassembly of the cable pairing 100. A pin 136 may positioned on each cable 110, 112. The pin may include an opening therein to be strung onto the respective wires 114, 116. The pin 136 may be generally cylindrical in shape, having a circular cross-section, and configured to fit into the eyelets 126, 128, 130, 132. It will be appreciated that the pins 136 may have any appropriately shaped cross-sectional shape, but may be shaped and size to fit into the eyelets 126, 128, 130, 132. The pins 136 may be positioned within the eyelets 126, 128, 130, 132 to allow the cables 110, 112 to rotate with respect to the yoke 120.

The cables 110, 112 may include components to prevent the wires 114, 116 from sliding out of the opening in the pins 136. On a first side of the pin 136, each cable 110, 112 may include an anchor 138. The anchor 138 may be clamped to the wires 114, 116 adjacent to the pin 136. The anchor 138 may be generally fixed in position to prevent the pin 136 from sliding along the wire in a first direction toward the anchor 138.

The cables 110, 112 may include a spring mechanism 140 positioned on a second side of the pin 136. The spring mechanism 140 may limit movement of the pin 136 in a second direction, and generally holding the pin 136 in a fixed position between the anchor 138 and the spring mechanism 140. The spring mechanism 140 may comprise an end cap 142, a spring 144, and a spring cap 146. The end cap 142 may be positioned at or near an end of the wire and the spring cap 146 may be positioned adjacent to the pin 136, on the side opposite the anchor 138. The spring 144 may be positioned between the end cap 142 and the spring cap 146 and configured to bias the spring cap 146 toward the pin 136 and to hold it in position.

The cables 110, 112 may include insulating components to protect the wires and facilitate movement of the cables 110, 112. A boot sleeve 148 may be connected to the anchor 138. The boot sleeve 148 may be collapsible to contract and expand in response to a force applied to it. The boot sleeve 148 may surround a portion of each wire 114, 116. The boot sleeve 148 may be composed of any appropriate material, such as rubber or any appropriate plastic or polymer.

A first end of the boot sleeve 148 may be connected to the anchor 138. For example, the anchor 138 may be clamped over a portion of the boot sleeve 148 to pinch the boot sleeve 148 between the anchor 138 and each wire 114, 116.

A second end of the boot sleeve 148 may be connected to an insulation 150. The insulation 150 may comprise a sheathing positioned around a portion of each wire 114, 116. The insulation 150 may include various layers, including an interior metal layer and an exterior rubber or plastic layer. The insulation 150 may connect to the boot sleeve 148 at connecting nut 152. The boot sleeve 148 may be generally tension fit about one side of the connecting nut 152 and the insulation 150 may be connected to a second side of the connecting nut 152.

The cable pairing 100 may be generally configured to allow the assembled cables 110, 112 to be connected to and removed from the yoke 120. Specifically, hinges 122, 124 may include features to allow the pins 136 to be connected to and removed from the yoke 120 without deforming the yoke 120.

Figure 4:
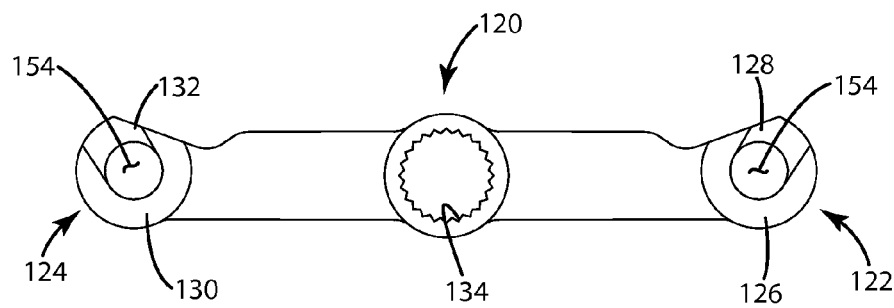
FIG. 4 illustrates a side view of a yoke.
Figure 5:
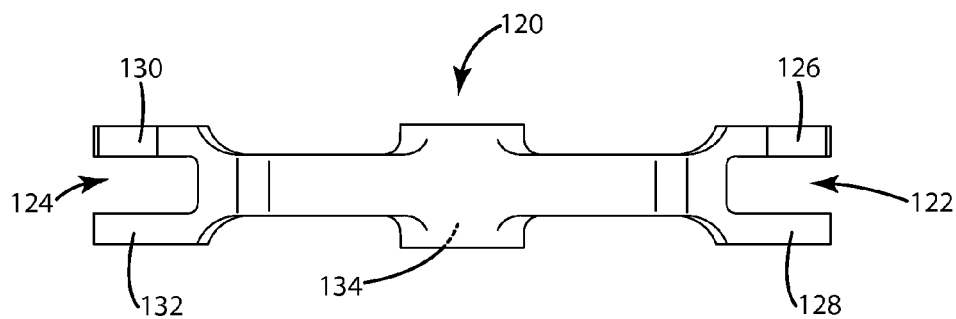
FIG. 5 illustrates a top view of a yoke.

In an embodiment, at least one of the eyelets on each side of the yoke 120 may be partially open. For example, one eyelet on each side of the yoke 120 may comprise a closed loop and one may comprise an unclosed or open loop. Each of the eyelets 126, 128, 130, 132 may be sized to receive a portion of a pin 136 and to allow the pin to rotate therein. As best seen in FIG. 4, one eyelet 126, 130 on each end of the yoke 120 may include a gap 154 to provide access into the eyelet opening. The gap 154 in each eyelet 126, 130 may be large enough to allow the pin 136 to slide into the eyelet opening. The first eyelet 126, 130 at each end of the yoke 120 may include a gap 154 and the second eyelet 128, 132 at each end of the yoke 120 may be fully surrounded without any gap.

A cable pairing 100 may be assembled by connecting previously assembled cables 110, 112 into the eyelets 126, 128, 130, 132 of the yoke 120. The pin 136 of each cable may be aligned with the gap 154 in each eyelet 126, 130. The spring cap 146 may be moved toward the end cap 142 by compressing the spring 144, or sliding the anchor 138, to provide space for the pin 136 to slide along each wire 114, 116. The pin 136 may be inserted into the eyelets 126, 128, 130, 132 by inserting one end of the pin 136 into the gap 154 and rotating the other end of the pin 136 into the opening in the opposite eyelet 128, 132. The spring 144 may then be released to allow the spring cap 146 to abut the pin and hold it in place and prevent the pins 136 from disconnecting from the eyelets 126, 128, 130, 132. To disconnect the assembled cables 110, 112, the spring 144 or anchor 138 may again be retracted and cables 110, 112 may be rotated to remove the pins 136 from the eyelets 126, 128, 130, 132.

In use, a cable pairing 100 may be connected to a vehicle or system having a gearing to be actuated. The yoke 120 may be mounted to a base on the vehicle by inserting a bolt through the central bore 134. The mounting through the central bore 134 may allow the yoke 120 to rotate with respect to the base. A first and second cables 110, 112 may be inserted into the yoke, as described above. A first end of the cables 110, 112 may be connected to a lever and the second end of the cables 110, 112 may be connected to a gear actuator. Pulling the lever in a first direction will rotate the yoke 120 in a first direction and cause the first cable 110 to pull while the second cable 112 goes slack. Pulling the lever in a second direction will rotate the yoke 120 in a second direction, opposite the first direction, and causing the second cable 110 to pull while the first cable 112 goes slack.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

I claim:

1. A control cable assembly comprising:
   a yoke comprising:
      a body having a first end and a second end;
      a first hinge at a first end of said body, said first hinge comprising a first eyelet forming a completely closed loop and a second eyelet forming a partially open loop;
      a second hinge at a second end of said body, said second hinge comprising a third eyelet forming a completely closed loop and a fourth eyelet forming a partially open loop;
   a first control cable connected to said first hinge;
   a second control cable connected to said second hinge; and
   a pin positioned in said first hinge, wherein said pin includes a hole and said first cable extends through said hole.

2. The control cable assembly of claim 1, wherein said first and second eyelets are aligned.

3. The control cable assembly of claim 1, wherein said first and second eyelets are spaced a distance apart.

4. The control cable assembly of claim 1, further comprising an anchor positioned on said first cable and located on a first side of said pin.

5. The control cable assembly of claim 1, further comprising spring mechanism positioned on said first cable and located on a second side of said pin.

6. The control cable assembly of claim 5, wherein said spring mechanism comprises a spring and a cap connected to said spring.

7. The control cable assembly of claim 1, wherein said first and second cables are configured to rotate with respect to said yoke.

8. The control cable assembly of claim 1 further comprising a central bore formed in said body and positioned between the first hinge and the second hinge.

9. The control cable assembly of claim 1, wherein said yoke is rotatably connected to a base.

10. The control cable assembly of claim 1, wherein said yoke is composed of cast metal.

* * * * *